UNITED STATES PATENT OFFICE.

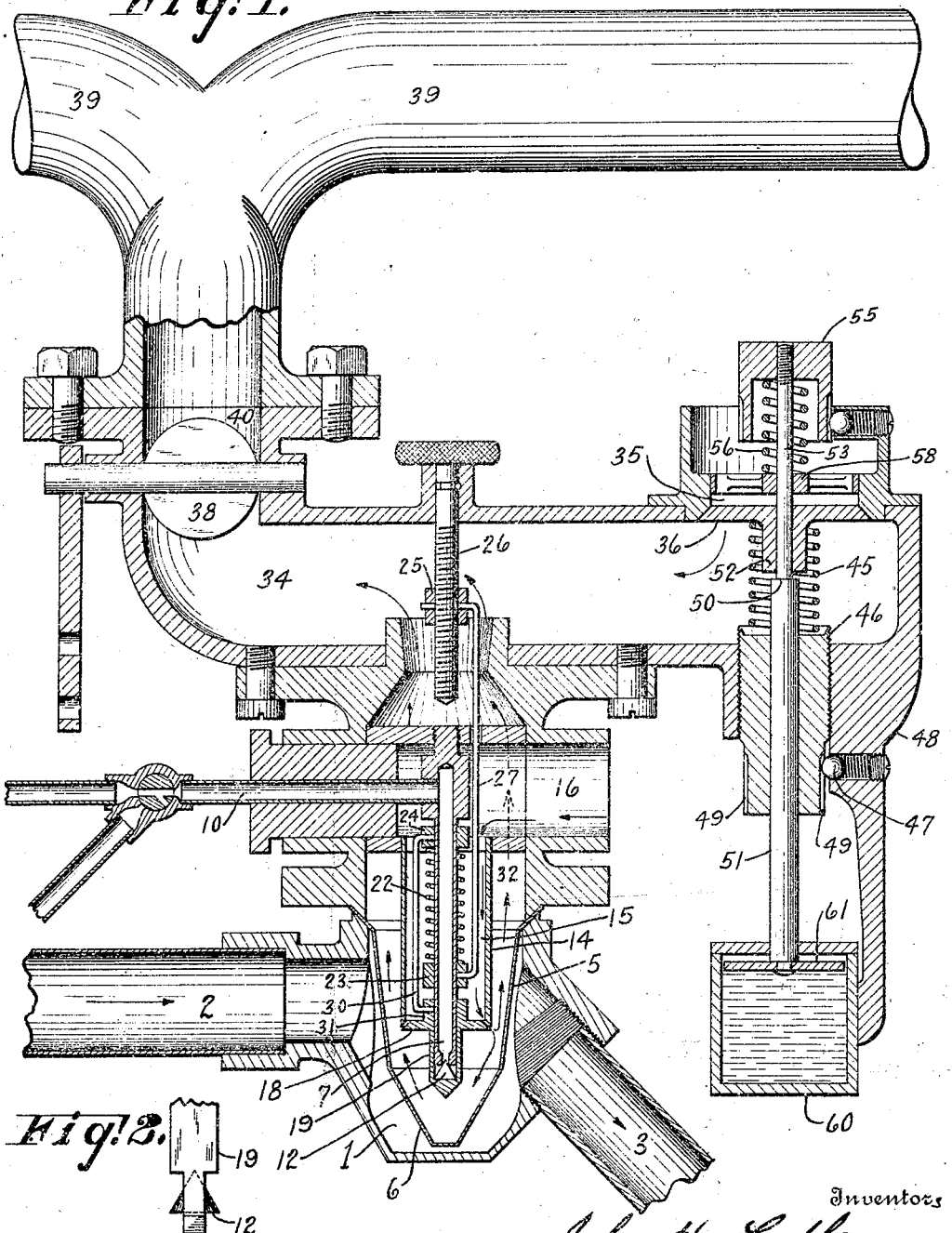

JOHN H. LYTLE, OF MILWAUKEE, CHARLES A. KLAWITER, OF LAKE, AND ARMIN KRITCH, OF MILWAUKEE, WISCONSIN.

CARBURETER.

1,178,530.  Specification of Letters Patent.  Patented Apr. 11, 1916.

Application filed July 11, 1914. Serial No. 850,287.

*To all whom it may concern:*

Be it known that we, JOHN H. LYTLE, CHARLES A. KLAWITER, and ARMIN KRITCH, citizens of the United States, said JOHN H. LYTLE and ARMIN KRITCH residing at Milwaukee and said CHARLES A. KLAWITER residing in the town of Lake, county of Milwaukee, and State of Wisconsin, have invented new and useful Improvements in Carbureters, of which the following is a specification.

Our invention relates to improvements in carbureters.

The object of our invention is to provide an efficient carbureter for heavy hydrocarbons, such as kerosene oil.

In the drawings Figure 1 illustrates our improved carbureter in vertical section, drawn to a plane cutting the axes of the vaporizing chamber and air inlet passages. Fig. 2 is a detail view of the spreader valve and its supporting hanger.

Our improved carbureter is of that type in which the liquid fuel is exposed to air currents and also to the influence of heat. In order to vaporize the liquid and produce a combustible mixture, we provide a chamber 1 into which exhaust gases may be delivered from the outlet port or ports of an internal combustion engine and from which said exhaust gases may pass through a duct 3. A vaporizing pan 5, preferably formed of sheet metal, is suspended in the chamber 1 and constitutes a portion of the walls of said chamber, the chamber 1 extending annularly around the pan and underneath the bottom thereof. The lower portion 6 of the pan is preferably tapered, as shown.

A fuel nozzle 7 extends downwardly into the pan 5 and discharges into the lower portion 6 thereof. Liquid hydrocarbon is delivered to the nozzle through a supply duct 10, and a blunt needle valve 12 seats in the nozzle outlet and serves not only to close the outlet but also constitutes a spreader, whereby when the needle valve is depressed to open position, the liquid fuel passing through the nozzle will be distributed to the sides of the tapered portion 6 of the pan.

An air tube 14 is concentric with the nozzle tube, forming an annular passage 15 leading downwardly along the nozzle tube from an air inlet port 16 to a point near the lower end of the nozzle tube. An annular check valve 18 normally closes the air passage 15 at the lower end. This check valve 18 is provided with a hanger 19, which supports the valve 12 in a position to open and close in correspondence with the opening and closing movements of the air valve 18. The air valve is normally held in closed position by a spring 22, the lower end of which bears upon a collar 23 and the upper end of which bears upon a collar 24. The collar 23 is supported from a nut 25 carried by an adjusting screw 26, said nut 25 being connected with the collar 23 by a link rod 27. The collar 24 is connected by a link rod 30 with a hub member 31 on the valve 18. When the screw 26 is properly adjusted, valve 18 will be supported in closed position by the upward pressure of spring 22 upon collar 24, but the tension of the spring 22 is sufficiently light so that if a partial vacuum is established in the pan 5 and in the tubular passage 32 extending upwardly therefrom, the valve 18 will be drawn downwardly to open position by suction.

The passage 32 leads upwardly to a mixing chamber or passage 34. This passage is provided with an auxiliary inlet port 35 normally closed by a valve 36, which also opens under suction.

38 is a throttle valve of ordinary type and 39 is the manifold, whereby the outlet 40 of the passage 34 may be connected with the respective cylinders of an internal combustion engine. It will be understood that during the suction stroke of the pistons in such cylinders, a partial vacuum will be established in the passages 34 and 32, whereby the air valve 18 will be depressed to open position, thereby also opening the cone or needle valve 12 and permitting a discharge of liquid fuel through the nozzle into the portion 6 of the pan. The exhaust gases from the engine may be delivered through the passage 2 into the chamber 1 surrounding the vaporizing pan, thereby vaporizing the hydrocarbon liquid and permitting the vapor to mix with the air which passes downwardly through the duct 15. The vapor passes upwardly through the duct 32 into the passage 34, where it is mixed with the air entering the port 35, the valve 36 having also been opened by suction.

The valve 36 is normally supported in closed position by a coiled spring 45 interposed between said valve and an adjustable nut 46, said nut being locked in any desired position of adjustment by a spring actuated ball 47 socketed in the wall 48 of the casing and adapted to resiliently enter the longitudinal channels 49 formed in the nut 46. But when the speed of the engine becomes rapid, the opening movement of valve 36 will be limited by a shoulder 50 on a controlling rod 51, which rod extends upwardly through a guide aperture in the nut 46 and through the valve 36, the latter being provided with a hub 52 for engagement with said shoulder 50. A reduced upper end 53 of the rod 51 has threaded engagement in a nut 55, whereby said nut may be adjusted on said rod to increase or diminish the tension of the coiled spring 56 interposed between said nut and a guide bar 58 through which the portion 53 of said rod passes.

Under strong suction in the passage 34, valve 36 will move downwardly until its hub 52 strikes the shoulder 50, after which its continued movement will actuate rod 51 downwardly against the tension of the spring 56 added to the tension of spring 45. The downward movement is further retarded by extending the lower end of the rod 51 into a dash pot 60 and providing it with a dash plate 61. The dash pot 60 is filled with oil or other liquid through which plate 61 must be forced, the resistance of the liquid retarding the downward movement of rod 61.

We claim—

1. A carbureter including a chamber provided with an inlet and outlet for exhaust gases, a vaporizing pan extending into said chamber and exposed on all sides to the heat thereof, valved passages for air and liquid hydrocarbon leading to said pan, a spreader valve controlling the flow of liquid through the hydrocarbon passage and adapted to direct it laterally in a thin conical sheet against all sides of the pan, an air valve also formed to direct the air against the sides of the pan and across the path of the hydrocarbon, and an outlet passage through which the air and vaporizing hydrocarbon may be discharged from said pan.

2. A carbureter including a hydrocarbon feed nozzle, in combination with a vaporizing pan into which said nozzle may discharge, means for heating said pan, an air duct and a vapor outlet duct concentric with the nozzle, a valve in the air duct opening in the direction of air flow, and a valve for the nozzle actuated from the air valve and adapted to serve as a spreader for the hydrocarbon to direct the same in a conical sheet across the path of the air and in the direction of the heated walls of the pan on all sides thereof.

3. A carbureter, including a fuel duct provided with a needle valve, in combination with an air duct concentric therewith and provided with a suction actuated check valve through which the fuel duct extends, connections between said check valve and the needle valve, a vaporizing pan located to receive the air and hydrocarbon delivered through the respective ducts, said ducts being arranged for downward and outward delivery with the valves serving as spreaders to direct the fluids directly against the walls of the pan and mix the same in the bottom portion of the pan, an outlet duct connected with the upper portion of the pan, and means for heating said pan, substantially as described.

4. A carbureter including an air duct provided with a controlling valve at the extremity thereof, a fuel duct extending longitudinally through the air duct and air valve and provided with a valve at its extremity connected with the air valve, means for resiliently closing said valves, adapted to yield and allow the valves to open when the exterior pressure is reduced, a vaporizing pan inclosing the duct outlets and valves and having walls converging to a closed end in the direction of fluid delivery from said ducts when the valves are open, means for heating said pan, and an outlet located at the opposite end of the pan from that into which the ducts discharge, whereby the fuel and air delivered from said ducts may impinge against the heated converging walls of the pan and reversed in direction at the closed end portion and the converging fluid currents thoroughly mixed during the reversing operation.

5. A carbureter, including an air valve, in combination with a depending needle valve connected therewith with its point projecting upwardly, and a spring adapted to normally lift the air valve to closed position, a downwardly projecting fuel nozzle which the needle valve normally closes, a downwardly discharging air passage which the air valve normally closes, said air passage being arranged to discharge the air past the fuel nozzle outlet a receiver against which the air and fuel may discharge, and means for heating the receiver.

6. A carbureter, including an air valve, in combination with a depending needle valve connected therewith with its point projecting upwardly, a spring adapted to normally lift the air valve to closed position, a downwardly projecting fuel nozzle which the needle valve normally closes, a downwardly discharging air passage which the air valve normally closes, a receiver against which the air and fuel may discharge, and a heated chamber surrounding the sides and bottom of said receiver.

7. A carbureter, including an air inlet passage having a downwardly extending valved outlet, in combination with an adjusting screw located above the outlet, a collar threaded on said screw, and a valve supporting member resiliently supported from said collar, substantially as described.

8. A carbureter, including the combination with an air inlet valve, of a screw threaded adjusting rod for regulating the closing pressure of said valve, a collar threaded upon the lower end of said rod, a link depending therefrom, another collar connected with the valve, and a spring supporting said last mentioned collar from said link, substantially as described.

9. A carbureter, including the combination with an air inlet valve, and a fuel nozzle extending therethrough, of a screw threaded adjusting rod for regulating the closing pressure of said valve, a collar threaded upon said rod, another collar loose on said fuel nozzle, means for resiliently supporting the loose collars from the other one, a link connecting the loose collar with the air valve, and a fuel valve linked to said air valve in the path of the air delivered past the air valve.

In testimony whereof we affix our signatures in the presence of two witnesses.

JOHN H. LYTLE.
CHARLES A. KLAWITER
ARMIN KRITCH.

Witnesses:
LEVERETT C. WHEELER
IRMA D. BREMER.